(12) United States Patent
Bradbrook (10) Patent No.: US 9,637,240 B2
(45) Date of Patent: May 2, 2017

(54) AIRCRAFT POWERPLANT

(71) Applicant: ROLLS-ROYCE PLC, London (GB)

(72) Inventor: Stephen John Bradbrook, Clevedon (GB)

(73) Assignee: ROLLS-ROYCE PLC, London (GB)

( * ) Notice: Subject to any disclaimer, the term of this patent is extended or adjusted under 35 U.S.C. 154(b) by 647 days.

(21) Appl. No.: 14/228,854

(22) Filed: Mar. 28, 2014

(65) Prior Publication Data

US 2014/0360206 A1    Dec. 11, 2014

(30) Foreign Application Priority Data

Apr. 24, 2013 (GB) .................................. 1307376.2

(51) Int. Cl.
| | |
|---|---|
| *B64D 27/14* | (2006.01) |
| *B64D 35/04* | (2006.01) |
| *F02C 7/32* | (2006.01) |
| *B64D 27/24* | (2006.01) |
| *B64D 31/00* | (2006.01) |
| *B64D 33/00* | (2006.01) |
| *B64D 35/00* | (2006.01) |
| *F02C 7/20* | (2006.01) |
| *B64D 35/08* | (2006.01) |

(Continued)

(52) U.S. Cl.
CPC ............. *B64D 27/14* (2013.01); *B64D 27/02* (2013.01); *B64D 27/24* (2013.01); *B64D 31/00* (2013.01); *B64D 33/00* (2013.01); *B64D 35/00* (2013.01); *B64D 35/04* (2013.01); *F02C 7/20* (2013.01); *F02C 7/32* (2013.01); *B64D 27/26* (2013.01); *B64D 35/08* (2013.01); *B64D 2027/026* (2013.01); *Y10T 29/49229* (2015.01)

(58) Field of Classification Search
CPC ........ B64D 27/14; B64D 27/24; B64D 27/02; B64D 35/04; B64D 27/26; B64D 2027/026; B64D 35/08
See application file for complete search history.

(56) References Cited

U.S. PATENT DOCUMENTS

| 4,496,120 A | 1/1985 | Eickmann | |
|---|---|---|---|
| 7,716,932 B2 * | 5/2010 | Core .................... | B64D 33/06 239/265.33 |
| 7,752,834 B2 * | 7/2010 | Addis ................... | B64D 27/10 244/60 |

FOREIGN PATENT DOCUMENTS

| CN | 201317462 Y | 9/2009 |
|---|---|---|
| CN | 202226062 U | 5/2012 |

(Continued)

OTHER PUBLICATIONS

Search Report issued in British Application No. 1307376.2 dated Oct. 11, 2013.

*Primary Examiner* — Philip J Bonzell
*Assistant Examiner* — Michael Kreiner
(74) *Attorney, Agent, or Firm* — Oliff PLC (57) ABSTRACT

An aircraft propulsion power plant for use in an aircraft includes one or more core engines housed in an airframe of the aircraft, one or more secondary propulsion units, each of the one or more secondary propulsion units being removably attached to the airframe, and one or more power transmission means, each of the one or more power transmission means being configured to transmit mechanical power from the or each core engine to a corresponding one of the or each secondary propulsion unit when the or each secondary propulsion unit is attached to the airframe.

20 Claims, 4 Drawing Sheets

(51) Int. Cl.
*B64D 27/26* (2006.01)
*B64D 27/02* (2006.01)

(56) References Cited

FOREIGN PATENT DOCUMENTS

GB  2 225 297 A  5/1990
GB  2485901 A  5/2012

* cited by examiner

AIRCRAFT POWERPLANT

This invention claims the benefit of UK Patent Application No. 1307376.2, filed on 24 Apr. 2013, which is hereby incorporated herein in its entirety.

FIELD OF THE INVENTION

The present invention relates to a modular power plant for an aircraft and particularly, but not exclusively, to a modular power plant for an unmanned aircraft.

BACKGROUND TO THE INVENTION

Unmanned Air Vehicles (UAVs) are performing an increasing number of roles in the military arena. Two of these roles are: Wide Area Surveillance (WAS) and Tactical Reconnaissance and Attack (TRA).

It is known that an aircraft optimised for the WAS role favours a high aspect ratio wing and one or more turboprop engines mounted in pods attached to the aircraft's airframe. In contrast, an aircraft optimised for the TRA role favours a low aspect ratio wing and a low bypass ratio turbofan mounted within the fuselage of the aircraft.

It has been proposed that a single aircraft could cover both WAS and TRA roles (a 'multi-role' aircraft) if it was designed to have interchangeable wings in order to vary the wing aspect ratio. However, at present, such an aircraft would have a single type of propulsion system which by necessity would have to be compromised for one or both of the WAS and TRA roles. As an example, such a compromise power plant might be a high bypass ratio turbofan.

A particular disadvantage of the prior art is that the propulsion system is non-optimum when the 'multi-role' aircraft is operated in either of the two proposed roles, i.e. WAS or TRA. This would translate into a performance deficit (for example, reduced range and/or endurance time) relative to an aircraft optimised for a single role.

STATEMENTS OF INVENTION

According to a first aspect of the present invention there is provided an aircraft propulsion power plant for use in an aircraft comprising:
one or more core engines housed in an airframe of the aircraft;
one or more secondary propulsion units, each of the one or more secondary propulsion units being removably attached to the airframe; and
one or more power transmission means, each of the one or more power transmission means being configured to transmit mechanical power from the or each core engine to a corresponding one of the or each secondary propulsion unit when the or each secondary propulsion unit is attached to the airframe.

The removable secondary propulsion unit enables the power plant to take on two distinct performance characteristics; a first characteristic when the power plant comprises the core engine(s) alone and a second characteristic when the power plant comprises the core engine(s) together with the secondary propulsion unit(s).

By appropriate selection of the operating parameters of the core engine(s) and the secondary propulsion unit(s) it is possible for the power plant of the present invention to be optimised for each of two different operating envelopes.

Optionally, the or each core engine comprises a turbofan engine and the turbofan engine comprises a low pressure spool.

In one arrangement the or each core engine is a turbofan engine and in particular a low bypass ratio turbofan engine. This arrangement provides for an aircraft power plant that has a first characteristic as outlined above and which is optimised for an aircraft operating in a TRA mode.

Optionally, the or each power transmission means is configured to transmit mechanical power from the low pressure spool of the or each core engine to a corresponding one of the or each secondary propulsion unit.

This enables the power plant of the present invention to be readily converted from a first configuration in which only the core engine(s) are providing motive thrust to the aircraft, to a second configuration in which both the core engine(s) and the secondary propulsion unit(s) are providing motive thrust to the aircraft.

Optionally, the or each secondary propulsion unit comprises a propeller.

A propeller may be readily sized to provide an additional level of motive thrust over and above that provided by the core engine(s) and which enable the power plant to be reconfigurable to have a second characteristic as outlined above in which it is optimised for an aircraft operating in a WAS mode.

This makes the power plant of the present invention more flexible for multi-role operation and therefore more efficient at fulfilling the requirements of the alternative WAS and TRA roles.

Optionally, the propeller is a variable pitch propeller.

The use of a variable pitch propeller enables the level of power extracted from the core engine to be controlled. In this way, the optimum combination of power extraction and low pressure spool speed can be selected to give the most efficient thrust for a given flight condition of the aircraft.

Optionally, the or each secondary propulsion unit comprises a ducted fan.

A ducted fan produces lower noise levels and lower vibration levels than a correspondingly sized propeller unit. This may be advantageous for a specific operating role of the aircraft, for example a lower noise level could provide for a more stealthy aircraft which is more difficult to detect.

Optionally, the fan is a variable pitch fan.

As for a propeller unit, the provision of variable pitch blades in the ducted fan unit enables the speed of the low pressure spool of the turbofan engine to be varied independently of the aircraft's flight condition and throttle setting. This in turn provides for a more efficient operating characteristic for the power plant.

Optionally, the or each power transmission means comprises an electrical generator attached to the or each core engine, an electrical power transmission means and an electric motor mounted within each of the one or more secondary propulsion units, and
the or each electrical generator being adapted to generate an electrical current during operation of the or each core engine, and the or each electrical power transmission means being adapted to transmit the electrical current to the or each corresponding electric motor.

The use of electrical power to drive the secondary propulsion unit(s) simplifies the mechanical arrangement of the power plant. This is because there is no mechanical driveshaft or other transmission components required to transmit drive from the low pressure spool of the core engine(s) to the secondary propulsion unit(s).

The transmission of electrical power requires only an electrical conduction means such as a cable. This means that the secondary propulsion unit(s) can be positioned in any position on the exterior surface of the aircraft so as to optimise its aerodynamic propulsive efficiency.

A key feature of this embodiment of the invention is that the propeller and the low pressure spool of the core engine may be made to operate at different rotational speeds. This would require conditioning of the electrical power using power electronics positioned between the electrical generator and the electric motor. For example, the electrical generator produces AC power of a certain frequency which is a function of the electrical generator and hence the low pressure spool speed. The AC electrical power is then converted to DC and then back to AC at a new frequency which is related to the required propeller speed. This sort of conditioning apparatus can be bulky and heavy.

A lighter alternative solution is the use of an electrical generator that produces an AC wave form which is transmitted directly to the electric motor. In this way, the rotational speed of both the electrical generator and the electric motor will be linearly linked.

Optionally, the or each electrical generator is driven from the low pressure spool of the turbofan engine.

Attaching the electrical generator directly to the low pressure spool of the core engine(s) eliminates the need to include a mechanical drive from the core engine(s) to the generator. This makes the arrangement simpler and more compact.

Optionally, the or each power transmission means comprises a driveshaft being in coupling engagement at a first end thereof with the or each core engine and at a second end thereof with the or each corresponding secondary propulsion unit.

Positioning a driveshaft at the front of the core engine(s) means that the core engine requires minimal modification for use as part of the power plant of the present invention.

A mechanical driveshaft provides a simple and robust means of transferring motive power from the core engine(s) to the corresponding secondary propulsion unit(s). Such an arrangement requires the secondary propulsion unit(s) to be positioned adjacent to the corresponding core engine(s).

Optionally, the or each driveshaft comprises:
  a first portion accommodated within the airframe of the aircraft; and
  a second portion accommodated within the or each corresponding secondary propulsion unit;
  wherein each first portion is removably coupled to each respective second portion.

By arranging the driveshaft in two portions with a coupling portion at a point part way along the driveshaft, the removal and replacement of the secondary propulsion unit(s) becomes more straightforward and may be performed quicker.

Optionally, the turbofan engine comprises a variable area exhaust nozzle.

In order to compensate for the level power extracted from the low pressure turbine of the core engine(s) it is necessary to adjust the cross-sectional area of the exhaust nozzle of the core engine(s) in order to ensure that the core engine(s) are operating at optimum efficiency.

Optionally, the turbofan engine comprises a removably attached exhaust nozzle.

As an alternative to a variable area exhaust nozzle, the exhaust nozzle of the core engine(s) may be removably replaceable. Such an arrangement while not providing for a full range of area adjustment for the exhaust nozzle can provide for a stepwise change of exhaust area. This enables the operating characteristic of the core engine(s) to be adjusted in dependence on whether the secondary propulsion unit is attached to the airframe or not.

Optionally, the power plant further comprises an engine control unit adapted to control the operation of the or each core engine by actively altering one or more engine control parameters in dependence on whether the or each secondary propulsion unit is attached to the airframe.

The Engine Control Unit (ECU) is used to monitor the performance of the engine and to control demand signals sent to it from a user.

In particular the ECU recognises the change in propulsion system architecture between the WAS and TRA modes and changes the method of engine control to suit the selected engine mode.

Optionally, the engine control parameters comprise one or more parameters selected from the group comprising:
  fuel flow rate;
  compressor air bleed volume;
  exhaust nozzle area
  variable stator geometry; and
  variable vane geometry.

The ECU continually monitors the performance of the core engine(s) by receiving signal inputs from transducers mounted on the engine. These signal inputs are then used to determine output signals that regulate those engine parameters which control engine power and speed.

Optionally, the power plant further comprises a convoluted air inlet duct being in fluid communication with an inlet face of the core engine such that there is no direct line of sight through the duct.

When operating in the WAS mode there is a requirement for the aircraft to be stealthy. In other words, it is advantageous for the aircraft to be difficult to detect by an adversary.

By shielding the inlet face of the core engine(s) from direct line of sight through the inlet duct attached to the engine and through the use of radar absorbing materials along the inlet duct walls it is possible to minimise the level of returned radar signal resulting from reflection from the rotating parts of the engine which might be visible at the inlet face, such as for example the compressor blades.

Optionally, each of the one or more secondary propulsion units comprises a pylon connecting the respective secondary propulsion unit to the airframe, a respective one of the one or more power transmission means being located within the corresponding pylon.

In order to provide clearance for the rotation of a propeller forming part of the secondary propulsion unit it is necessary to space the axis of the propeller from the exterior surface of the aircraft.

This may be advantageously achieved by mounting the secondary propulsion unit in a pylon which in turn is removably mounted to the exterior surface of the aircraft. The pylon is advantageously formed with a teardrop shaped cross section. Alternatively, the pylon may take another cross section, such as an ellipse or a mandorla, so as to minimise the aerodynamic drag of the pylon.

According to a second aspect of the present invention there is provided a method of configuring an aircraft comprising the steps of:
  a. providing an airframe having a power plant as claimed in any one of Claims 1 to 14;
  b. attaching to the airframe a first lifting surface if the or each secondary propulsion unit is attached to the airframe; and c. alternatively, attaching to the airframe a second lifting surface if the or each secondary propulsion unit is not attached to the airframe.

By providing an aircraft with interchangeable lifting surfaces, in the form of wings, and a removable secondary propulsion unit it is possible to readily change the operating characteristics of the aircraft from one optimised for the WAS role to one optimised for the TRA role.

This makes such an aircraft more versatile and cost effective to operate than two aircraft each of which is optimised for one of the two aforementioned roles.

Optionally, the first lifting surface comprises a pair of high aspect ratio wings.

Optionally, the first lifting surface comprises a pair of low aspect ratio wings.

Optionally, the aircraft comprises an engine control unit, and step b comprises the additional step of:
  b1. providing the engine control unit with a first set of pre-determined control parameters;
and step c comprises the additional step of:
  c1. providing the engine control unit with a second set of pre-determined control parameters.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of embodiments of the invention, by way of non-limiting examples, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
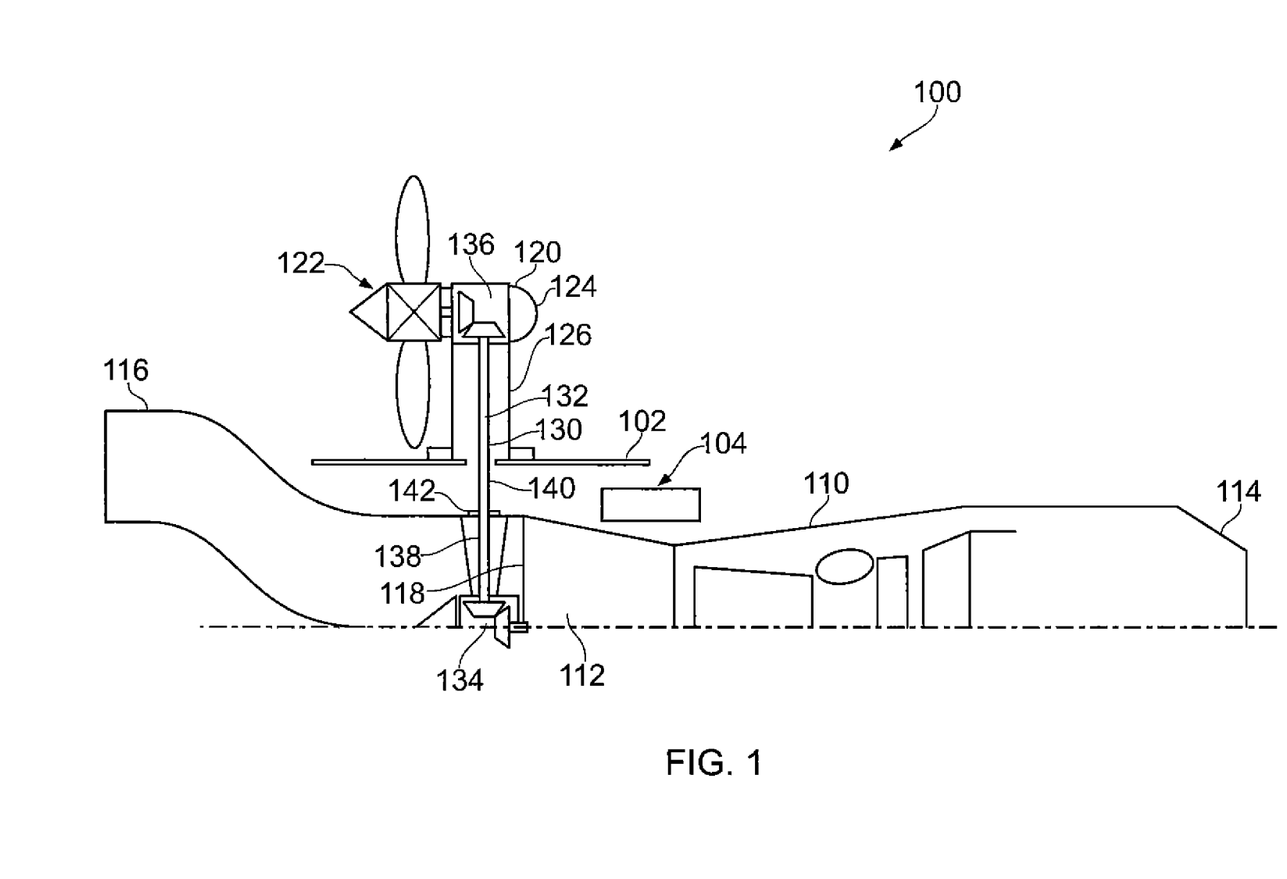
FIG. 1 shows a schematic part-sectional view of a power plant according to a first embodiment of the invention.

Referring to FIG. 1, a power plant according to a first embodiment of the invention is designated generally by the reference numeral 100.

The power plant 100 comprises a core engine 110 housed within the airframe 102 of an aircraft (not shown), a secondary propulsion unit 120 housed in a nacelle 124, and a power transmission means 130.

The core engine 110 is a low bypass ratio turbofan engine. The core engine 110 is provided with a low pressure compressor 112 that has been designed with lower aerodynamic loading levels than the low pressure turbine from a conventional turbofan engine. This is necessary in order for the core engine 110 to efficiently produce the additional power required to drive the secondary propulsion unit 120.

The core engine 110 has an inlet face 118 being the frontmost surface of the core engine 110. In the present embodiment, this inlet face 118 is represented by the plane of the leading edges of the turbine spool 118. The inlet face 118 of the core engine 110 is connected to a convoluted inlet duct 116 which is configured to feed inlet air to the core engine 110.

The geometry of the convoluted inlet duct 116 is such that there is no direct line of sight along the inlet duct 116 in the direction of the inlet face 118 of the core engine 110. This property of the inlet duct 116 assists in minimising the returned radar signature of the core engine 110 and thus the aircraft when subjected to incident radar waves.

In the present embodiment the inlet duct 116 is convoluted in only a single plane and takes the form of an 'S-shaped' curve. However, in other embodiments the inlet duct 116 may be convoluted in more than one plane and may be formed with more than one 'S-shaped' curve.

The core engine 110 is provided with a variable area exhaust nozzle 114. This allows the exhaust nozzle area to be varied in dependence of whether the secondary propulsion unit 120 is fitted to the airframe 102.

In an alternative arrangement the core engine 110 may be provided with a removable exhaust nozzle which itself may be substituted for a replacement exhaust nozzle having a different cross-sectional area. In this arrangement, the replaceable exhaust nozzle allows for the performance characteristics of the engine to be broadly altered. While not providing the equivalent range of exhaust area variation that would be available with the variable area nozzle 114, this arrangement imposes a smaller weight penalty on the aircraft than the variable area nozzle 114.

The power plant 100 is provided with an engine control unit 104 that monitors the operational status of the core engine 110 and controls the engine performance responsive to the demands of a user of the aircraft.

The secondary propulsion unit 120 comprises a propeller 122 mounted on a nacelle 124 which in turn is fitted with a pylon 126. The propeller 120 is driven from the low pressure spool 118 of the core engine 110 and so the rotational speed of the propeller 120 is a linear function of the shaft speed of the low pressure spool of the core engine 110. In the present embodiment the propeller 120 is a variable pitch propeller. This enables the propulsive efficiency of the propeller 120 to be optimised over a range of rotational speeds of the core engine 110.

The pylon 126 is configured so as to be removably attachable to the airframe 102 of the aircraft. The nacelle 124 and the pylon 126 are each provided with an aerodynamically shaped exterior surface so as to minimise the drag produced by these components when the aircraft is in flight.

The power transmission means 130 comprises a driveshaft 132, a first gearbox 134 at one end of the driveshaft 132, and a second gearbox 136 at the other end of the driveshaft 132. The first gearbox 134 transfers the mechanical drive from the low pressure spool 112 of the core engine 110 to the driveshaft 132. The second gearbox 136 then transfers the mechanical drive from the driveshaft 132 to the propeller 122.

In the present embodiment, each of the first gearbox 134 and the second gearbox 136 is a bevel gearbox that turns the direction of the mechanical drive through approximately 90°.

The first gearbox 134 is positioned on the front end, or nose, of the low pressure spool 112 of the core engine 110. The second gearbox 136 is positioned within the nacelle 124 and drives the propeller 122.

In the present embodiment, the driveshaft 132 is formed as a first driveshaft portion 138 that is located within the airframe 102, and a second driveshaft portion 140 that is substantially located within the pylon 126 of the secondary propulsion unit 120. At the junction of the first driveshaft portion 138 and the second driveshaft portion 140 there is provided a driveshaft intermediate coupling 142.

The driveshaft intermediate coupling 142 enables the driveshaft 132 to be readily separated when the secondary propulsion unit 120 is removed from the airframe 102. In the present arrangement the driveshaft intermediate coupling 142 is a dog clutch. However alternatively any form of readily disconnectable coupling may be used for the driveshaft intermediate coupling 142.

Figure 2:
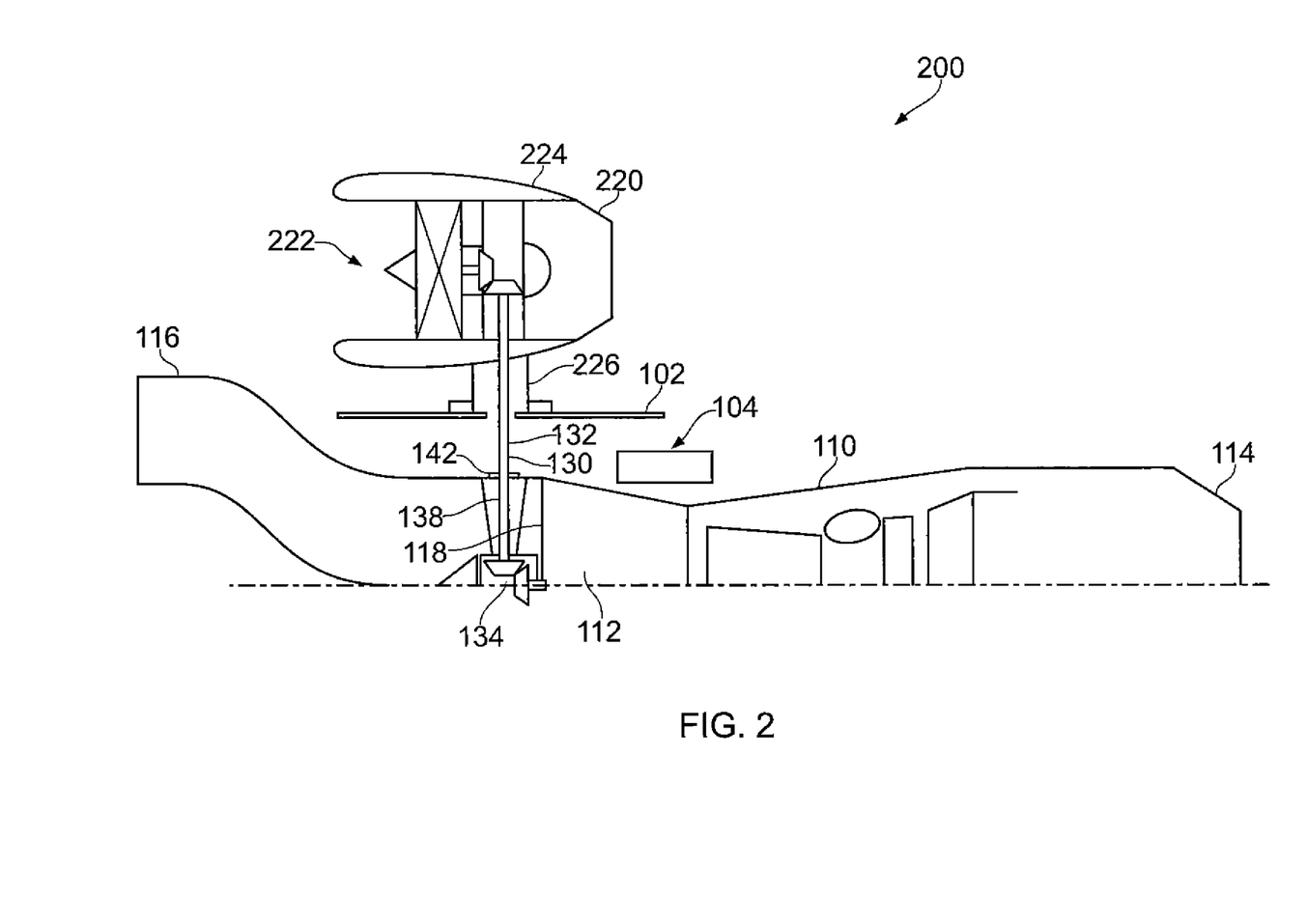
FIG. 2 shows a schematic part-sectional view of a power plant according to a second embodiment of the invention.

Referring to FIG. 2, a power plant according to a second embodiment of the invention is designated generally by the reference numeral 200. Features of the power plant 200 which correspond to those of power plant 100 have been given corresponding reference numerals for ease of reference.

The power plant 200 comprises a core engine 110 housed within the airframe 102 of an aircraft (still not shown), a secondary propulsion unit 220 housed in a nacelle 124, and a power transmission means 130.

The secondary propulsion unit 220 differs from the secondary propulsion unit 120 in that the secondary propulsion unit 220 comprises a ducted fan 222 in place of the propeller 120.

In a similar manner to the first embodiment 100, the ducted fan 222 is housed within a nacelle 224 which is provided with a pylon 226 that is, in turn, removably attached to the airframe 102.

As mentioned above with respect to the first embodiment 100, the ducted fan 222 is provided with variable pitch blades. This allows the efficiency of secondary propulsion unit 220 to be optimised over a range of rotational speeds of the core engine 110.

In an alternative arrangement, the ducted fan 222 may be provided with a fan assembly having fixed pitch blades. Such an arrangement will be simpler, lighter and less costly than a variable pitch arrangement but will necessarily be less aerodynamically efficient.

Figure 3:
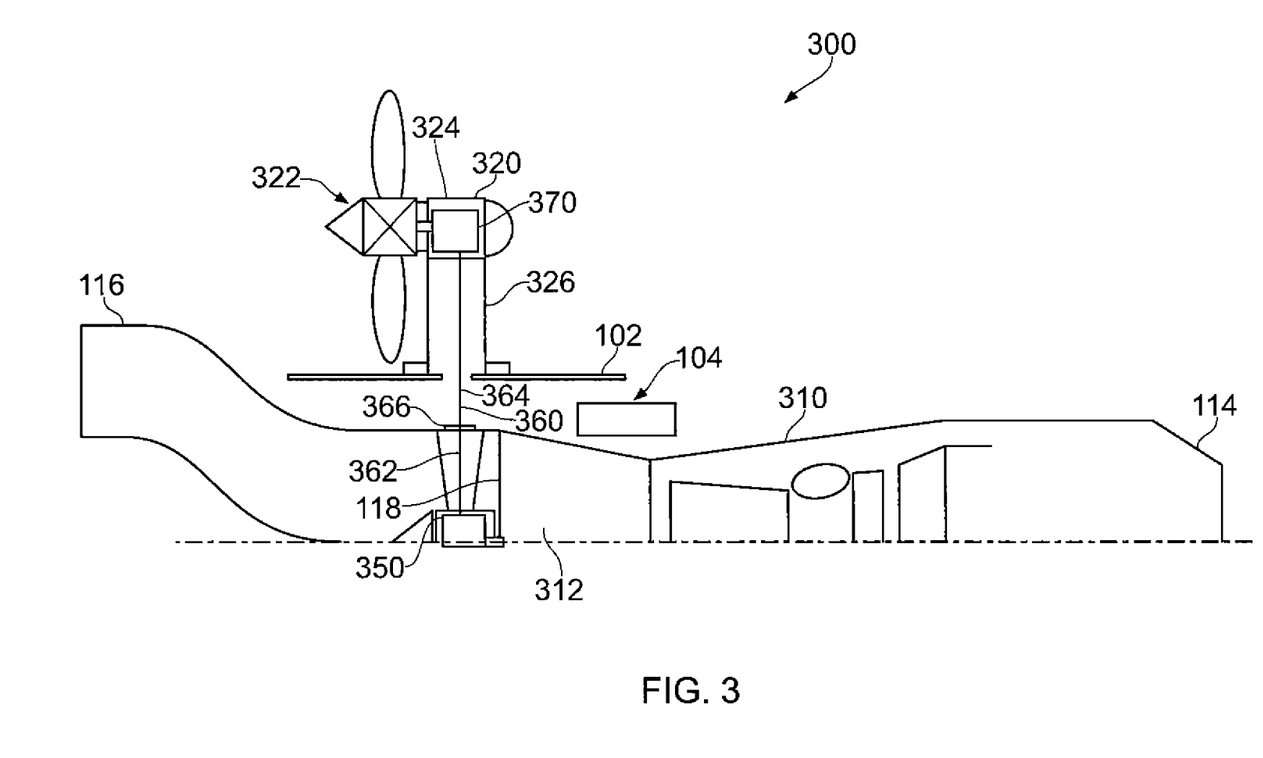
FIG. 3 shows a schematic part-sectional view of a power plant according to a third embodiment of the invention.

Referring to FIG. 3, a power plant according to a third embodiment of the invention is designated generally by the reference numeral 300. Features of the power plant 300 which correspond to those of power plant 100 have been given corresponding reference numerals for ease of reference.

The power plant 300 comprises a core engine 310 housed within the airframe 102 of an aircraft (still not shown), a secondary propulsion unit 320 housed in a nacelle 324, and an electrical power transmission means 360.

The secondary propulsion unit 320 comprises a propeller 322 mounted on a nacelle 324 which in turn is fitted with a pylon 326. The propeller is directly connected to an electric motor 370 which is accommodated within the nacelle 322. The propeller 322 is a fixed pitch propeller.

Since the propeller 322 of the power plant 300 is driven independently of the core engine 310 via the electric motor 370 it is possible to realise some of the benefits of a variable pitch propeller. In particular, the weight penalty and additional complexity associated with a variable pitch propeller need not be incurred in this embodiment.

However, in an alternative arrangement, the propeller 322 of the power plant 300 may be a variable pitch propeller since this may allow for optimum matching between the rotational speeds of the propeller 322 and the core engine 310.

The electrical power transmission means 360 comprises an electrical generator 350 positioned on the front end, or nose, of the low pressure spool 112 of the core engine 110.

Electrical power generated by the electrical generator 350 passes via a first electrical conductor 362, an electrical conductor coupling 366 and a second electrical conductor 364 to the electric motor 370 that is positioned within the nacelle 324.

The first electrical conductor 362 is located within the airframe 102, while the second electrical conductor 364 is substantially located within the pylon 326. The electrical conductor coupling 366 allows the first electrical conductor 362 to be separated from the second electrical conductor 366 when the secondary propulsion unit 320 is removed from the airframe 102.

In use a 'multi-role' aircraft can be configured for use in either of a WAS (FIG. 4) or a TRA (FIG. 5) role. In each configuration the aircraft has a common airframe 102.

Figure 4:
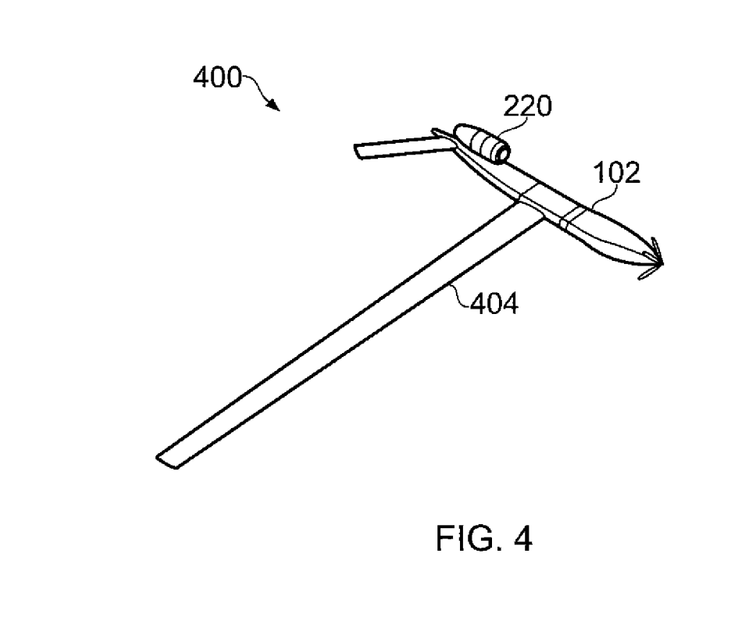
FIG. 4 shows a perspective partial view of an aircraft configured for a WAS role.
Figure 5:
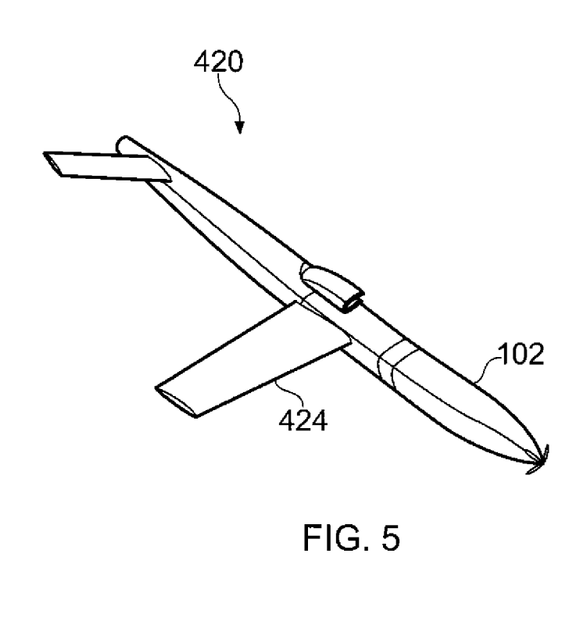
FIG. 5 shows a perspective partial view of an aircraft configured for a TRA role.

In the WAS role as shown in FIG. 4 the aircraft 400 comprises an airframe 102 that is fitted with high aspect ratio wings 404 and a secondary propulsion unit 220. In this arrangement the secondary propulsion unit 220 comprises a ducted fan according to the second embodiment of the invention.

In contrast, in the TRA role illustrated in FIG. 4 the aircraft 420 comprises an airframe 102 that is fitted with low aspect ratio wings 424 and no secondary propulsion unit.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. An aircraft propulsion power plant for use in an aircraft comprising:
   one or more core engines housed in an airframe of the aircraft;
   one or more secondary propulsion units, each of the one or more secondary propulsion units being removably attached to the airframe;
   one or more power transmission means, each of the one or more power transmission means being configured to transmit mechanical power from the or each core engine to a corresponding one of the or each secondary propulsion unit when the or each secondary propulsion unit is attached to the airframe; and
   an engine control unit adapted to control the operation of the or each core engine by actively altering one or more engine control parameters in dependence on whether the or each secondary propulsion unit is attached to the airframe.

2. The power plant as claimed in claim 1, wherein the or each core engine comprises a turbofan engine and the turbofan engine comprises a low pressure spool.

3. The power plant as claimed in claim 2, wherein the or each power transmission means is configured to transmit mechanical power from the low pressure spool of the or each core engine to a corresponding one of the or each secondary propulsion unit.

4. The power plant as claimed in claim 2, wherein the turbofan engine comprises a variable area exhaust nozzle.

5. The power plant as claimed in claim 2, wherein the turbofan engine comprises a removably attached exhaust nozzle.

6. The power plant as claimed in claim 1, wherein the or each secondary propulsion unit comprises a propeller.

7. The power plant as claimed in claim 6, wherein the propeller is a variable pitch propeller.

8. The power plant as claimed in claim 1, wherein the or each secondary propulsion unit comprises a ducted fan.

9. The power plant as claimed in claim 8, wherein the fan is a variable pitch fan.

10. The power plant as claimed in claim 1, wherein the or each power transmission means comprises an electrical generator attached to the or each core engine, an electrical power transmission means and an electric motor mounted within each of the one or more secondary propulsion units, and the or each electrical generator being adapted to generate an electrical current during operation of the or each core engine, and the or each electrical power transmission means being adapted to transmit the electrical current to the or each corresponding electric motor.

11. The power plant as claimed in claim 10, wherein the or each electrical generator is driven from the low pressure spool of the turbofan engine.

12. The power plant as claimed in claim 1, wherein the or each power transmission means comprises a driveshaft being in coupling engagement at a first end thereof with the or each core engine and at a second end thereof with the or each corresponding secondary propulsion unit.

13. The power plant as claimed in claim 12, the or each driveshaft comprising:

a first portion accommodated within the airframe of the aircraft; and a second portion accommodated within the or each corresponding secondary propulsion unit;

wherein each first portion is removably coupled to each respective second portion.

14. The power plant as claimed in claim 1, wherein the engine control parameters comprise one or more parameters selected from the group comprising:

fuel flow rate;

compressor air bleed volume;

exhaust nozzle area variable stator geometry; and variable vane geometry.

15. The power plant as claimed in claim 1, further comprising a convoluted air inlet duct being in fluid communication with an inlet face of the core engine such that there is no direct line of sight through the duct.

16. The power plant as claimed in claim 1, wherein each of the one or more secondary propulsion units comprises a pylon connecting the respective secondary propulsion unit to the airframe, a respective one of the one or more power transmission means being located within the corresponding pylon.

17. A method of configuring an aircraft comprising the steps of:

a. providing an airframe having a power plant as claimed in claim 1;

b. attaching to the airframe a first lifting surface if the or each secondary propulsion unit is attached to the airframe; and c. alternatively, attaching to the airframe a second lifting surface if the or each secondary propulsion unit is not attached to the airframe.

18. The method as claimed in claim 17, wherein the first lifting surface comprises a pair of high aspect ratio wings.

19. The method as claimed in claim 17, wherein the first lifting surface comprises a pair of low aspect ratio wings.

20. The method as claimed in claim 17, the aircraft comprising an engine control unit, wherein step b comprises the additional step of:

b1. providing the engine control unit with a first set of pre-determined control parameters;

and step c comprises the additional step of:

c1. providing the engine control unit with a second set of pre-determined control parameters.

* * * * *